US010175699B2

(12) United States Patent
Chiodini et al.

(10) Patent No.: US 10,175,699 B2
(45) Date of Patent: Jan. 8, 2019

(54) METHOD FOR AUTOMATICALLY ASSISTING WITH THE LANDING OF AN AIRCRAFT

(71) Applicant: Safran Electronics & Defense, Boulogne-Billancourt (FR)

(72) Inventors: Alain Chiodini, Boulogne-Billancourt (FR); Francois Dufresne De Virel, Boulogne-Billancourt (FR); Sylvain Pouillard, Boulogne-Billancourt (FR)

(73) Assignee: SAFRAN ELECTRONICS AND DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/744,040

(22) PCT Filed: Jul. 15, 2016

(86) PCT No.: PCT/EP2016/066985
§ 371 (c)(1),
(2) Date: Jan. 11, 2018

(87) PCT Pub. No.: WO2017/009471
PCT Pub. Date: Jan. 19, 2017

(65) Prior Publication Data
US 2018/0203466 A1     Jul. 19, 2018

(30) Foreign Application Priority Data
Jul. 16, 2015   (FR) ...................................... 15 01512

(51) Int. Cl.
*G05D 1/06*     (2006.01)
*G01S 11/10*    (2006.01)
(Continued)

(52) U.S. Cl.
CPC .......... *G05D 1/0676* (2013.01); *B64D 45/04* (2013.01); *G01P 3/38* (2013.01); *G01S 3/14* (2013.01);
(Continued)

(58) Field of Classification Search
USPC ........................................................ 701/16
See application file for complete search history.

(56) References Cited

U.S. PATENT DOCUMENTS 4,454,510 A      6/1984  Crow
6,154,693 A *  11/2000  Aberschitz ............ G01S 5/0054
                                                                701/120
(Continued)

FOREIGN PATENT DOCUMENTS

GB          2302318         1/1997

OTHER PUBLICATIONS

International Search Report and Written Opinion with English Language Translation, dated Oct. 19, 2016, Application No. PCT/EP2016/066985.

*Primary Examiner* — Tyler D Paige
(74) *Attorney, Agent, or Firm* — Womble Bond Dickinson (US) LLP

(57) ABSTRACT

The present invention relates to a method for automatically assisting with the landing of an aircraft on a runway from a return point (A) to a completion point (D), at which the aircraft touches the runway, by means of a data-processing device on-board said aircraft, which device is configured to be connected to an altimeter and a deviation meter, the method including: a return-navigation assistance phase including guidance of the aircraft, on the basis of measurements of the azimuth deviation of the aircraft relative to a reference direction linking said return point (A) and the position of the deviation meter (E) transmitted by said
(Continued)

deviation meter, from the return point (A) towards the position of the deviation meter (E), determination of the position of the aircraft at a predetermined capture point (B) that is aligned with the return point (A) and the position of the deviation meter (E), and guidance of the aircraft along a predetermined path from the capture point (B) to a predetermined holding point (C), which is approximately aligned with the axis of the runway, on the basis of altitude data provided by the altimeter and heading and speed data relating to the aircraft, a landing assistance phase including guidance from the holding point (C) to the completion point (D).

20 Claims, 8 Drawing Sheets

(51) Int. Cl.
 B64D 45/04 (2006.01)
 G01S 3/14 (2006.01)
 G01S 13/86 (2006.01)
 G01S 13/91 (2006.01)
 G01P 3/38 (2006.01)
(52) U.S. Cl.
 CPC .............. *G01S 11/10* (2013.01); *G01S 13/86* (2013.01); *G01S 13/867* (2013.01); *G01S 13/913* (2013.01)

(56) References Cited

U.S. PATENT DOCUMENTS

| | | | | |
|---|---|---|---|---|
| 8,768,542 | B2* | 7/2014 | Garrec | G01C 23/005 |
| | | | | 701/13 |
| 9,710,710 | B2* | 7/2017 | Malecki | G06K 9/0063 |
| 2005/0004723 | A1* | 1/2005 | Duggan | G05D 1/0061 |
| | | | | 701/24 |
| 2006/0106506 | A1* | 5/2006 | Nichols | G05D 1/101 |
| | | | | 701/3 |
| 2007/0129855 | A1* | 6/2007 | Coulmeau | G08G 5/0039 |
| | | | | 701/3 |
| 2008/0071431 | A1* | 3/2008 | Dockter | B63B 35/50 |
| | | | | 701/3 |
| 2009/0055038 | A1* | 2/2009 | Garrec | G01S 11/10 |
| | | | | 701/17 |
| 2009/0243911 | A1* | 10/2009 | Comic | G01S 7/40 |
| | | | | 342/36 |
| 2010/0168949 | A1* | 7/2010 | Malecki | G05D 1/0676 |
| | | | | 701/24 |
| 2014/0142787 | A1* | 5/2014 | Tillotson | G05D 1/101 |
| | | | | 701/3 |
| 2015/0153740 | A1* | 6/2015 | Ben-Shachar | G05D 1/0676 |
| | | | | 701/16 |
| 2016/0104384 | A1* | 4/2016 | Hanel | G01S 13/02 |
| | | | | 701/17 |
| 2016/0274577 | A1* | 9/2016 | Heinonen | B64D 1/08 |
| 2016/0284222 | A1* | 9/2016 | Nicholls | G01S 1/045 |
| 2017/0092137 | A1* | 3/2017 | Hiebl | B64C 39/024 |
| 2017/0161907 | A1* | 6/2017 | Malecki | G06T 7/74 |
| 2018/0068163 | A1* | 3/2018 | Malecki | G06K 9/0063 |

* cited by examiner

METHOD FOR AUTOMATICALLY ASSISTING WITH THE LANDING OF AN AIRCRAFT

GENERAL TECHNICAL FIELD

The invention relates to the field of aircraft guidance.

The subject thereof is more particularly a method for automatically guiding an aircraft, such as a drone, from a position remote from an airport up until landing of the aircraft on a runway.

STATE OF THE ART

Existing drone guidance systems allow the autonomous guiding of a drone along a predefined trajectory, corresponding for example to a pathway for an observation mission. To obtain such guidance, the position of the aircraft is determined at regular intervals and compared with the trajectory to be followed. This position is generally determined using a receiver of an absolute positioning system via satellite such as the GPS or Galileo systems, called GNSS systems ("Global Navigation Satellite System").

It may nevertheless happen that the aircraft's computer is incapable of determining the current position of the aircraft, either because of failure of one component of the aircraft such has a GNSS receiver, or because of unavailability of the signal from the positioning system, for example if it is jammed. Without knowing the position of the aircraft, the on-board computer is incapable of guiding the aircraft to cause it to follow the predetermined trajectory. The aircraft guiding system is then particularly incapable of causing the aircraft to arrive at its planned landing point such as the runway of an airport or landing strip of a provisional aerodrome. There is therefore a risk of the aircraft crashing at an unknown position and of being lost.

There is therefore a need for a guidance method allowing the reliable, autonomous guidance of an aircraft from a remote return point to a runway and to cause the aircraft to land thereupon, in spite of unavailability of satellite positioning, whilst minimizing the work load of the drone operator and even without action on the latter's part.

Document U.S. Pat. No. 4,454,510 describes a method for automatically assisting the landing of an aircraft on a runway from a given point to an end point, wherein the distance and altitude of the aircraft are determined. The method is configured to be linked to an altimeter and a deviation indicator configured to measure an azimuth deviation of the aircraft relative to the magnetic north direction as determined. It also comprises an assisted landing phase. With this method it is therefore necessary to geo-locate the aircraft and to determine the altitude thereof via a previous step to determine the position of the magnetic north and of the runway, this being complex and requiring calibration of the assistance system.

Document US 2009/055038 proposes a similar method using the direction of the runway as reference axis to measure deviation from azimuth. Here again, the method requires geolocation of the aircraft and determination of its altitude as well as a calibration step of the assistance system.

Finally, document GB 2 302 318 describes a method for the guided landing of a drone, comprising determination of the positioning of the aircraft at predetermined marked points, and guidance of the aircraft from a given point to a hang point from altitude data computed by an image analysis system, and aircraft course data.

PRESENTATION OF THE INVENTION

In a first aspect, the present invention relates to a method for the automatic assisted landing of an aircraft on a runway, from a return point to an end point at which the aircraft comes into contact with the runway, said method being implemented by a data processing device onboard said aircraft and configured to be connected to:
  an altimeter configured to measure the altitude of the aircraft;
  a deviation indicator positioned at a ground station and configured to measure an azimuth deviation of the aircraft relative to a reference point relative to a reference direction connecting said return point and the position of the deviation indicator;
said method being characterized in that it comprises:
  an assisted return navigation phase comprising:
    guidance of the aircraft, based on measurements of azimuth deviation of the aircraft relative to said reference direction transmitted by the deviation indicator, from the return point in the direction of the position of the deviation indicator;
    determination of the position of the aircraft at a predetermined capture point approximately aligned with the return point and the position of the deviation indicator;
    guidance of the aircraft along a predefined trajectory from the capture point to a predetermined hang point approximately aligned with the axis of the runway from altitude data provided by the altimeter and course and speed data of the aircraft;
  an assisted landing phase comprising guidance from the hang point to the end point on the runway.

By return point is meant here the point at which the aircraft is detected by the assisted landing system. It will be noted that in the invention this return point is defined without its position (altitude, distance, etc.) being known, and only allows defining of the reference direction that is subsequently used to guide the aircraft during the assisted return navigation phase.

The aircraft can therefore be led to a known capture position by means of azimuth deviation data provided by the deviation indicator, and then guided from this position to the end point without requiring the use of a high-performance navigation unit integrated in the aircraft.

The positioning of the aircraft at the capture point can be determined from distance data between the aircraft and a reference point on the ground aligned with the return point and the position of the deviation indicator.

Said data can allow positioning of the aircraft along the reference axis extending between the return point-deviation indicator (AE), thereby giving information on when the capture point B is reached.

Said distance data can be estimated from measurements of the propagation time of data packets between the ground station and the aircraft.

Said distance data can be estimated from measurements of the one-way propagation time of data packets between the ground station and the aircraft, said ground station and the aircraft comprising synchronized docks.

Mere measurement of a propagation time of packets which may be transmitted between the aircraft and the ground station for other needs thereby allows determination of whether the capture point is reached, without it being necessary to use an additional onboard or ground system, thereby minimizing energy consumption by the aircraft.

Determination of the positioning of the aircraft at the capture point may comprise estimation of speed data of said aircraft, and determination of a distance travelled by the aircraft from the return point from said speed data.

The data processing device being configured to be further linked to an optronic system comprising an image capture device onboard the aircraft, and positioned along the axis of the aircraft, and an image processing device adapted for processing said images, the speed data of said aircraft can be estimated by said optronic system by measuring the ground speed using images captured by said image capture device and altitude data provided by the altimeter.

The aircraft can therefore determine its position on the return point-deviation indicator (AE) axis autonomously with accuracy independent of the distance separating the aircraft from the deviation indicator and the ground station.

The speed data of said aircraft can also be estimated by measuring a Doppler effect generated by movement of the aircraft on signals exchanged between the aircraft and the ground station.

The speed of the aircraft can therefore be determined even in the event of unfavorable weather conditions masking the ground.

The data processing device being configured to be further linked to an image capture device onboard the aircraft, the position of the aircraft at the capture point can be determined by detecting a landmark of known position in at least one image captured by said image capture device.

Said detection allows determination of the position of the aircraft at the capture point B with reduced uncertainty, the position of the detected landmark possibly being known with high accuracy.

The aircraft can be guided between the return point and the capture point along a predefined rectilinear trajectory in the direction of the position of the deviation indicator.

Such a trajectory allows minimization of the distance travelled and hence of the energy consumed by the aircraft to reach the capture point B.

The aircraft can be guided between the return point and the capture point along a zigzag or stair-step trajectory.

Such a trajectory allows improved accuracy of aircraft guidance, by comparing the positioning data of the aircraft seen by the deviation indicator with the corresponding values such as determined by the aircraft.

The data processing device being configured to be further linked to a camera onboard the aircraft, the assisted landing phase may comprise estimation of a position of the end point in an image of the runway captured by the camera, and estimation of a position of the aircraft as a function of said estimated position of the end point in the image and of altitude data provided by the altimeter, and said guiding of the aircraft from the hang point to the end point is achieved by maintaining the aircraft aligned with the axis of the runway.

The guiding of the aircraft can therefore be performed throughout the landing phase with less uncertainty than if it had been based on measurements of the deviation indicator. This increased accuracy allows reliable guiding of the aircraft between the hang point and the end point, and to cause it to land.

The data processing device being further configured to be linked to a transceiver onboard said aircraft and intended to receive signals transmitted by at least three transceivers positioned on the ground, the assisted landing phase may comprise estimation of position data of the aircraft from distance data between the onboard transceiver and said at least three transceivers positioned on the ground.

The use of distance data between the aircraft and fixed ground points of known position, such as the ground transceivers, allows reduced uncertainty of the position of the aircraft and precise guiding of the aircraft up to the end point.

In a second aspect, the invention concerns a computer program product comprising code instructions to execute the method according to the first aspect, when this program is executed by a processor.

In a third aspect, the invention concerns a data processing device configured to implement the assistance method of the first aspect.

In a fourth aspect, the invention concerns a system for automatic assisted landing of an aircraft on a runway from a return point to an end point at which the aircraft comes into contact with the runway, comprising:
  an altimeter configured to measure the altitude of the aircraft;
  a deviation indicator positioned at a ground station and configured to measure an azimuth deviation of the aircraft relative to a reference point relative to a reference direction connecting said return point and the position of the deviation indicator;
  the data processing device of the third aspect.

Said assistance system in the fourth aspect may also comprise an optronic system comprising an image capture device onboard the aircraft and configured to be connected to the data processing device.

Said assistance system in the fourth aspect may also comprise a camera and its associated image processing device, both configured to be connected to the data processing device.

Said assistance system in the fourth aspect may additionally comprise:
  at least three transceivers positioned on the ground;
  a transceiver configured to receive signals transmitted by said at least three transceivers positioned on the ground, onboard said aircraft, and configured to be connected to the data processing device.

Such computer program product, data processing system and system have the same advantages as those indicated for the method according to the first aspect.

PRESENTATION OF THE FIGURES

Other features and advantages will become apparent on reading the following description of an embodiment. This description is given with reference to the appended drawings in which:

FIG. 1 schematically illustrates an example of the guided landing of an aircraft on a runway from a return point to an end point according to one embodiment of the invention;

DETAILED DESCRIPTION

Figure 1:
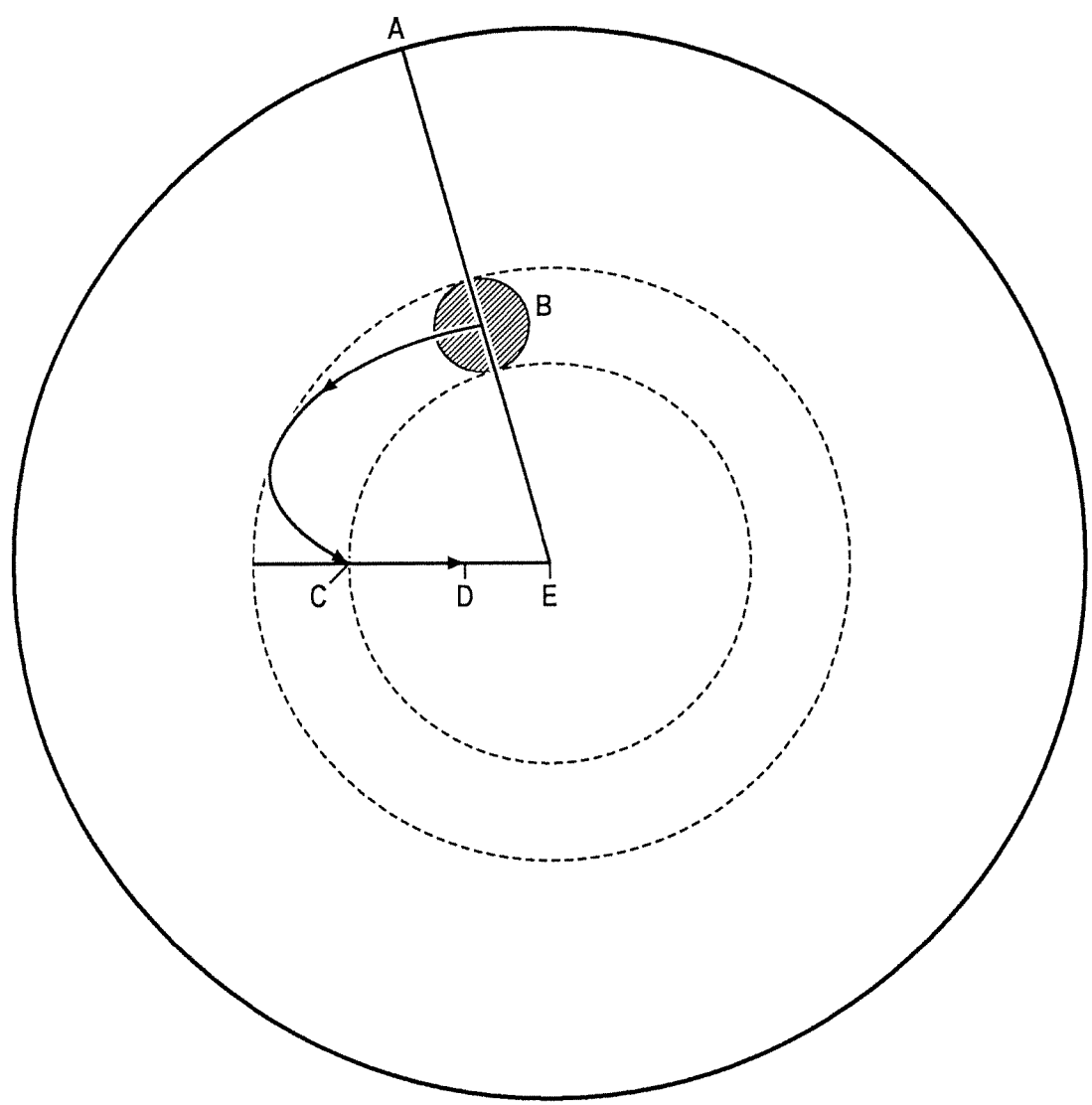
Figure 2:
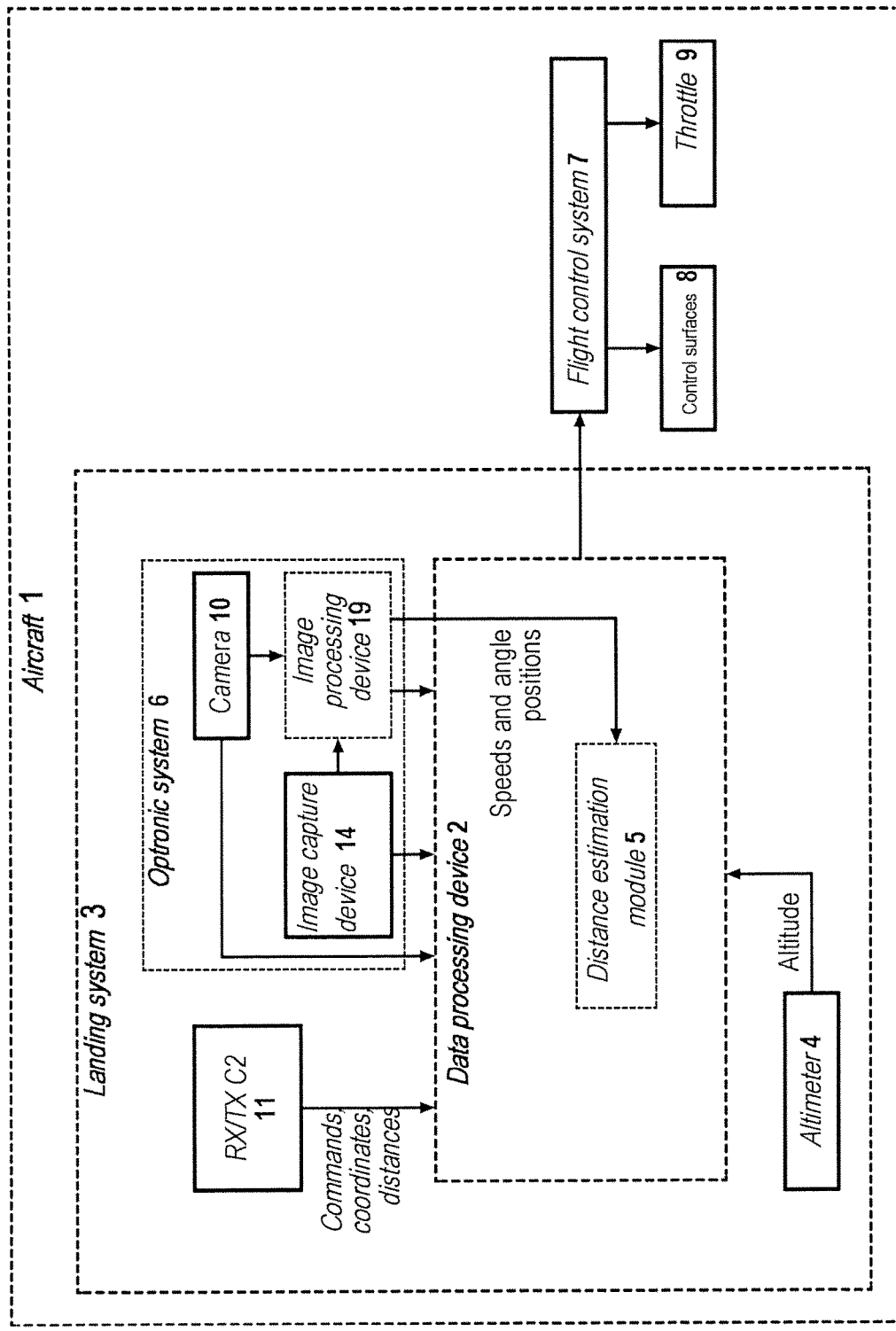
FIG. 2 illustrates the different components able to be included in an assisted aircraft landing system according to the invention.

One embodiment of the invention concerns a method for automatic assisted landing of an aircraft 1 on a runway from a return point A up to an end point D at which the aircraft comes into contact with the runway, as illustrated in FIG. 1. This method is implemented by a data processing device 2 of an assisted landing system 3, as illustrated in FIG. 2. The assisted landing system 3 may also comprise an altimeter 4 onboard the aircraft, with which the data processing device may be connected.

With reference to FIG. 1, the following points may also be defined:
- return point A: point at which the aircraft is detected by the assisted landing system 3. It will be noted that in the invention this point is defined without its position (altitude, distance, etc.) being known;
- capture point B: point at which the aircraft enters into an alignment phase with the runway for landing;
- hang point C: point aligned with the axis of the runway via which the aircraft must pass before landing.

The altimeter 4 may be a barometric altimeter or laser altimeter. A barometric altimeter can have accuracy to within 10 meters and can be readjusted by the value of atmospheric pressure QNH which is barometric pressure corrected for instrument, temperature and gravity errors and brought to mean sea level (MSL). In practice, QNH pressure can be given with reference to the threshold of the runway, so that the altimeter displays the geographical altitude of the end point D when the aircraft is on the runway threshold under consideration. A laser altimeter can have accuracy to within 0.2 meters and can be used when the altitude is lower than 100 meters.

In addition, the aircraft 1 as is known per se can be equipped with an automatic pilot configured to maintain the aircraft 1 when inflight on a defined course and at a defined altitude.

This method proposes reliable guiding of an aircraft such as a drone, and autonomously from a remote return point to a runway, for example an airport runway or a rougher landing strip, and to cause the aircraft to land thereupon despite unavailability of the satellite positioning system or GNSS, by first guiding the aircraft towards a predetermined point, called capture point B, of known position and relatively close to the runway, by guiding the aircraft in a set direction, the deviation from said set direction being determined and transmitted by a ground system from measurements of azimuth data of the aircraft relative to this ground system.

For this purpose, the data processing device 2 is able to be placed onboard the aircraft and may comprise a computer and a communication interface. Such an onboard computer may be a processor or microprocessor of x-86 or RISC type for example, a controller or microcontroller, a DSP, an integrated circuit such as an ASIC or programmable circuit such as an FPGA, a combination of said elements or any other combination of components allowing implementation of the computing steps of the above-described method. Such a communication interface may be any interface, analogue or digital, allowing the computer to exchange data with the other elements of the assistance system 3 such as the altimeter 4. For example, such an interface may be a RS232 series interface, USB interface, Firewire, HDMI or a network interface of Ethernet type, or any type of interface used in aeronautics.

As illustrated in FIG. 2, the computer of the data processing device 2 can be connected to a flight control system (FCS) 7. The flight control system 7 may be in charge of effective guiding of the aircraft in the reference direction to be followed, towards the capture point B, using guidance data provided by the computer of the data processing device, as a function of aircraft attitude data, such as course, roll and pitch determined by sensors integrated in the FCS, and azimuth deviation data provided by the ground system mentioned above. For this purpose, the flight control system can transmit set points to the driving members of the aircraft such as electrical, hydraulic or hybrid actuators actuating the control surfaces 8 or throttle 9. The aircraft is thus servo-guided on a set direction towards said capture point B.

Figure 3:
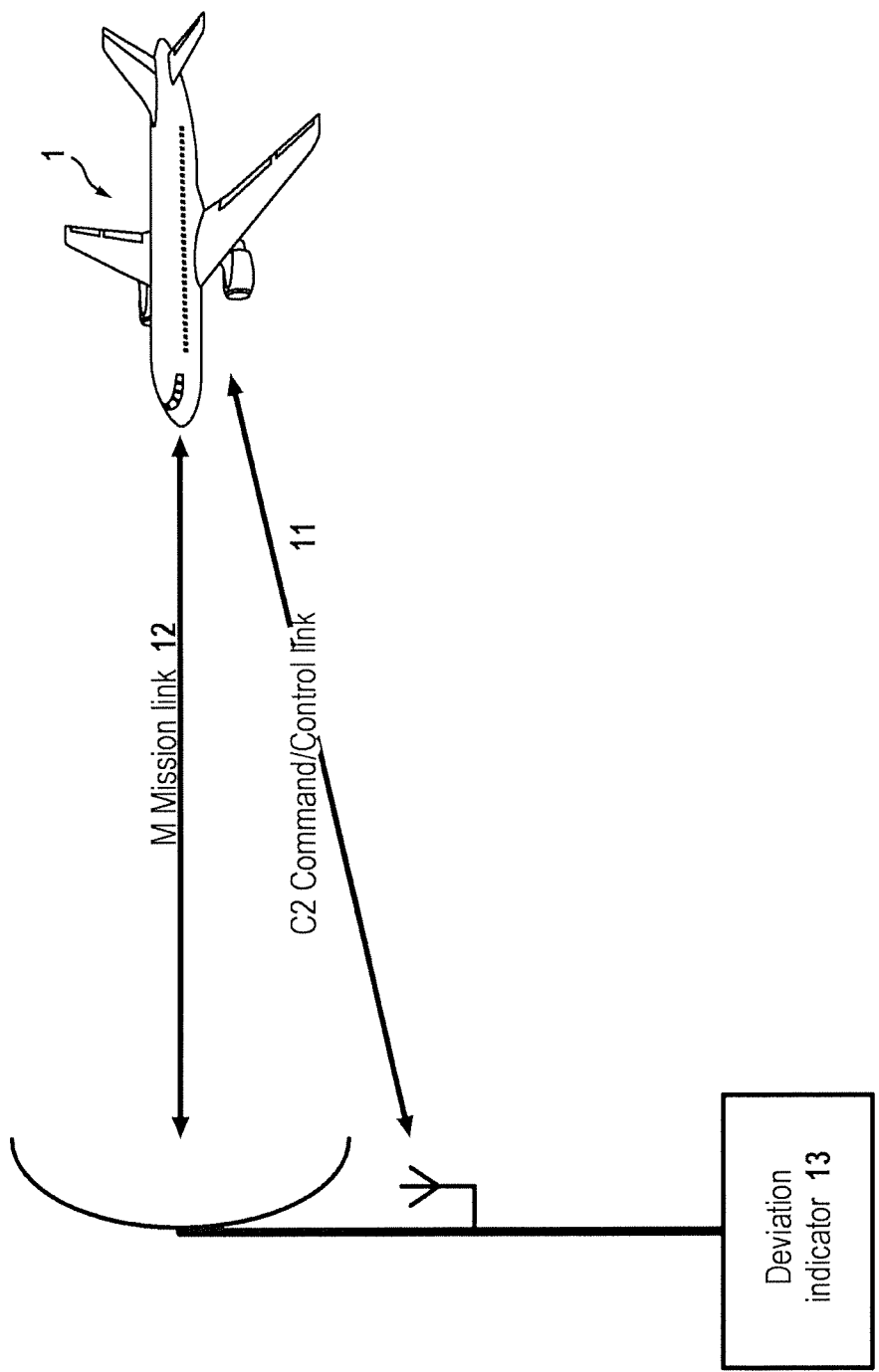
FIG. 3 illustrates the two links linking the data processing device to a ground station, and the deviation indicator included in the assisted landing system of the invention.

The data processing device 2 can be linked to a ground station, generally positioned close to the airport or the runway, via two links as illustrated in FIG. 3:
- a so-called "C2 command/control" two-way radio link 11 in a band of the electromagnetic spectrum of between 3 and 6 GHz allowing exchange of control and command messages between the ground station and the aircraft. The signals transmitted are modulated by means of single-carrier modulation and are transmitted/received by means of an omnidirectional antenna mounted on a masthead at the ground station;
- a mission data M two-way radio link 12 in a band of the electromagnetic spectrum of between 10 and 15 GHz allowing exchange of data flows generated by the different onboard sensors. The transmitted signals are modulated by means of multi-carrier modulation and are transmitted/received by a directional antenna such as a dish mounted on a masthead.

The assisted landing system 3 also comprises a deviation indicator 13. Such a deviation indicator is a ground system linked to the directional antenna of the ground station and used for the mission link 12. The deviation indicator is configured for continuous measurement of the direction of travel of the aircraft i.e. the azimuth of the aircraft relative to a reference direction e.g. the north. The deviation indicator may also measure the elevation of the aircraft relative to a reference plane, for example a plane tangent to the ground. Azimuth and elevation of the aircraft are measured relative to a reference point, for example relative to the position of the directional antenna mounted on a masthead. This reference point is called the position of the deviation indicator in the remainder of this document and is denoted E. The deviation indicator can measure these angles from the orientation of the directional antenna provided by an antenna-positioning electromechanical device configured to position the bearing and elevation of the directional antenna so that it points towards the aircraft to maximize link quality.

The method proposes using these azimuth data determined by the deviation indicator to guide the aircraft in the direction of the position of the deviation indicator. More specifically, the direction that the aircraft must be caused to follow is the subject of a closed servo-loop: the deviation indicator is able to measure and transmit to the aircraft the deviation between these measured azimuth data and an azimuth to be followed corresponding to the direction AE connecting the return point A and the position of the deviation indicator E. From these azimuth deviation data, the computer of the data processing device determines guidance data and transmits these to the flight control system, the flight control system then being able to orient the aircraft to cancel this deviation and guide the aircraft towards the position of the deviation indicator E.

This step of the method therefore allows relative guiding of the aircraft without the need for geolocation thereof by determining, at a prior step, the position of the return point A, the position of the magnetic north or the position of the runway as proposed in the prior art. The method of the invention is therefore simpler and overcomes the need for prior calibration of the system. It is sufficient to detect the aircraft in order to initiate guidance. In addition, the use of the axis (AE) as reference direction circumvents the need to use an onboard navigation unit.

In one embodiment, the elevation of the aircraft is treated as its azimuth. The deviation indicator may also transmit to the aircraft an elevation deviation between the measured elevation of the aircraft and a reference elevation corresponding to the elevation in direction AE measured when positioning the aircraft at the return point A. The use of said elevation deviation by the flight control system in this case leads to a progressive decrease in the altitude of the aircraft as and when it approaches the position of the deviation indicator.

In a second embodiment, only the measurements of azimuth deviation are used to guide the aircraft, taken at constant altitude as a function of the measurements of the aircraft's altimeter.

In a third embodiment, the azimuth and elevation measurements are used for guidance, but the altitude of the aircraft is maintained constant by varying the reference elevation over time that is used for measurements of elevation deviation.

In a last embodiment, a guidance similar to the first embodiment is performed up until the aircraft has reached a minimum altitude, after which guidance is performed at constant altitude.

In the different embodiments described below, the aircraft altitude data provided by the altimeter can be corrected if necessary to correspond to the relative altitude of the aircraft relative to a reference point, for example relative to the altitude of the deviation indicator. This makes it possible for example to overcome variations in altitude of the terrain over which the aircraft flies.

The aircraft can be guided in this direction until it is positioned at a capture point B of known position, relatively close to the runway. In one embodiment, the capture point B is approximately aligned with the return point A and the position of the deviation indicator E, when the azimuth to be followed by the aircraft is aligned with axis AE. Alternatively, the azimuth to be followed may deviate from axis AE and the capture point B will then lie distant from this axis and non-aligned with the return point A and position of the deviation indicator E.

From this capture point B of known position, a predefined trajectory can be imposed upon the aircraft so as to bring it to a predetermined hang point C approximately aligned with the axis of the runway with an aircraft propagation direction also aligned with the axis of the runway. The hang point C may be located on the periphery of a hanging area centered on the end point D or on the position of the deviation indicator E and of predetermined radius as illustrated in FIG. 1. For example, such a hanging area may have a radius of 5 km or less.

The assisted landing system 3 may also comprise one or more additional systems allowing detection of the positioning of the aircraft at the capture point B.

The assisted landing system may thus comprise an optronic system 6 comprising an image capture device 14 onboard the aircraft, and an image processing device 19 adapted to process said images and connected to the processing device 2. The image processing device is configured so that it can detect any type of object of determined characteristics (geometric characteristics, light characteristics, heat signature, etc.) and define therefrom an angle position relative to a reference axis (for example relative to the axis of travel of the aircraft passing through the center of the captured image or any position defined in this image). This capture device and its associated image processing device can be utilized to detect a ground landmark located at the capture point B or in the vicinity thereof. Such a ground landmark may be a building, geographical marking or landmark such as a road intersection. The detection of this landmark in the images captured by the image capture device allows determination of the instant in time at which the aircraft is approximately positioned at the capture point B. The field of vision of the image capture device is not necessarily centered on the axis of travel of the aircraft. The angle between the aircraft travel axis and the axis connecting the image capture device and a predetermined point in the images captured by the device, e.g. the center thereof, can be determined via construction or calibration to determine the direction of propagation of the aircraft relative to the images captured by this device. This direction can be materialized in the captured images if it is included in the field of vision of the device and is known to the image processing device.

The positioning of the aircraft at the capture point B can also be determined from measurement of the distance between the aircraft and a reference point on the ground aligned with the return point A and the position of the deviation indicator E. This reference point on the ground is for example the position of the deviation indicator E itself. The distance data between the aircraft and the position of the deviation indicator can be determined by the ground station as a function of the transmission time of a signal between the ground station and the aircraft, or else using another system such as radar, and these distance data can be transmitted to the aircraft via the command/control link 11. Alternatively, as illustrated in FIG. 2, the aircraft can itself estimate the distance separating it from the ground station. In this case the assistance system 3 may then comprise a distance estimation module 5 onboard the aircraft and in charge of estimating the distance between the aircraft and the ground station. This module can be integrated in the processing device 2. The distance estimation module can estimate this distance by measuring the propagation time of at least one data packet between the aircraft and the ground station on the command/control link 11 or on the mission link 12. Alternatively, the distance estimation module may integrate or be linked to an additional onboard transceiver dedicated to the exchange of data packets with the ground station for measurement of the distance between the aircraft and the ground station; the distance estimation module can then estimate this distance by measuring the propagation time of at least one data packet between the aircraft and the ground station via this additional transceiver. The data packets transmitted between the aircraft and the ground station can be time-stamped so that a one-way propagation time is able to be determined between the aircraft and the ground station. In this case the aircraft may have a clock onboard, synchronized with a clock of the ground station.

The positioning of the aircraft at the capture point B can also be determined using the speed data of the aircraft relative to the ground, to calculate the distance travelled by the aircraft from the return point A. These speed data can be obtained via the optronic system 6, or else by measurement of speed by other onboard equipment described above e.g. measurement of Doppler effect on the electromagnetic waves exchanged on one of the two data links, or else measurement of speed by one or more additional dedicated devices onboard the aircraft. For example, a Pitot tube can be used to measure the relative speed of the aircraft relative to ambient air, another sensor positioned for example at the ground station can be used to measure wind speed and these two measurements can be combined to estimate the speed of the aircraft relative to the ground.

The assisted landing system 3 may comprise an additional positioning system dedicated to guiding the aircraft in the hanging area during a landing phase up to the end point.

In a first embodiment, the assisted landing system 3 comprises a camera 10 onboard the aircraft with which the image processing device can be connected. Such a camera may be an infrared panoramic camera e.g. of SWIR type (Short Wave Infrared Range having a wavelength of between 0.9 and 1.7 microns), MWIR (Medium Wave Infrared Range) or LWIR (Long Wave Infrared Range). It may also operate in the visible spectrum. This camera 10 can be merged with the image capture device 14 or else be separate therefrom. The video flow acquired by the camera is transmitted first to the image processing device 19 to identify the runway and to determine via the processing device 2 the position of the aircraft relative to the runway on landing, and secondly to the ground station by means of the "mission" link. In one embodiment, the camera is an image capture system able to comprise several optical fields, several detection spectral bands and even several image sensors as a function of the missions assigned thereto. The image processing system is configured so that it can combine and analyze all its images using known methods.

Figure 4:
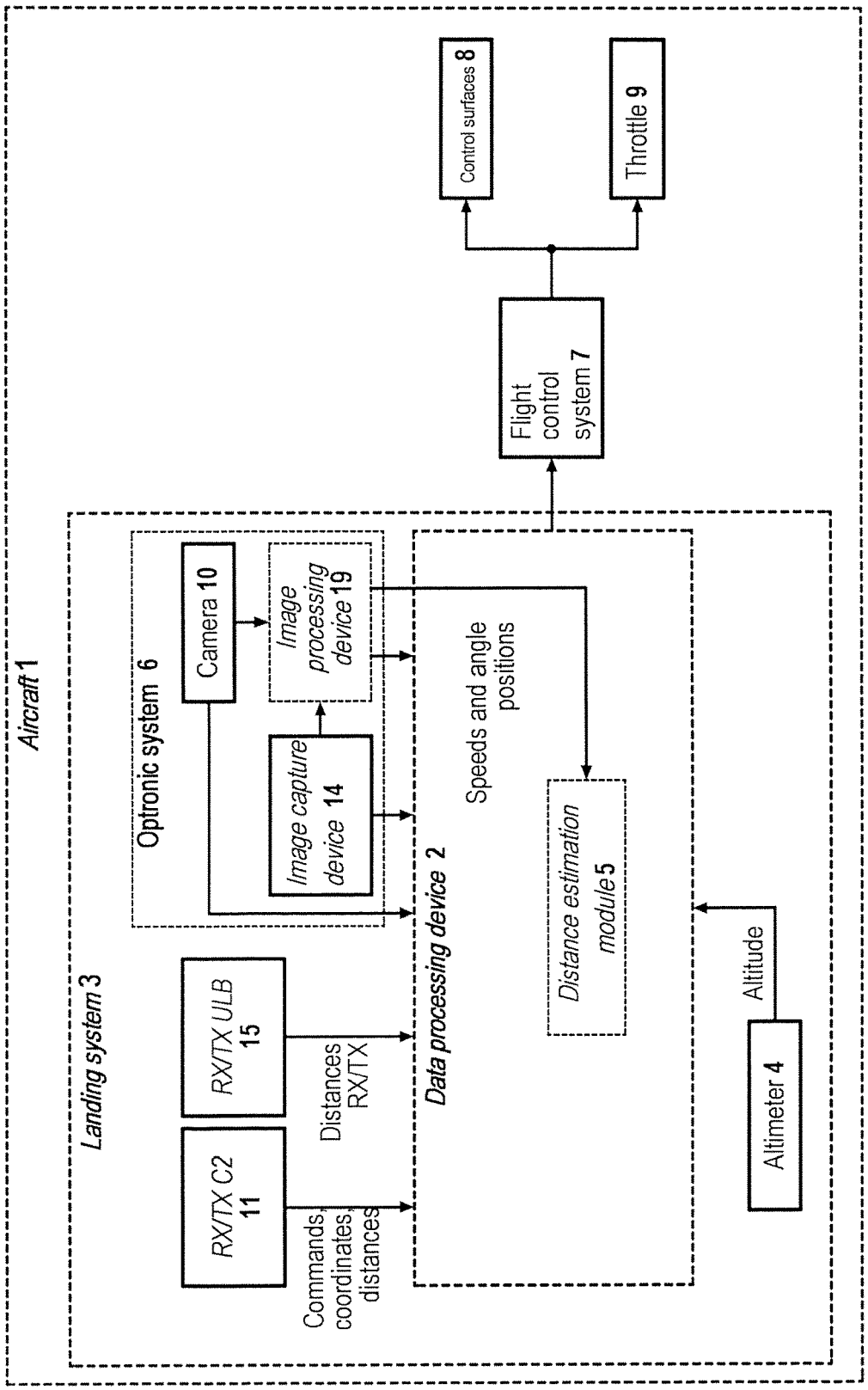
FIG. 4 illustrates an assisted aircraft landing system according to one embodiment of the invention.

In a second embodiment illustrated in FIG. 4, the assisted landing system 3 comprises at least one transceiver positioned on the ground and a transceiver 15 onboard the aircraft and configured to be linked to the data processing device 2. Said transceivers may be ULB (Ultra large band) radio beacons. By exchanging signals with the ground transceiver(s), the onboard transceiver is capable of determining the distance separating it from each of the ground transceivers, for example by measuring the round-trip transmission time of a signal. The onboard transceiver is also configured to transmit these distances to the processing device 2. Knowing the positions of the ground transceivers, the processing device 2 can then determine a corrected position of the aircraft from the azimuth and elevation data transmitted by the deviation indicator and the distance data provided by the onboard transceiver. In practice, a position of the aircraft can be estimated in this manner by using at least four transceivers or at least three transceivers plus aircraft altitude data provided by the altimeter.

The steps of the method are described in more detail in the following paragraphs with reference to FIG. 5.

The method may comprise an assisted return navigation phase P1 during which the processing device guides the aircraft along a predefined trajectory from the return point A as far as the predetermined hang point C approximately aligned with the axis of the runway from altitude data provided by the altimeter 4, course and speed data of the aircraft and deviation data (particularly azimuth and optionally elevation) transmitted by the deviation indicator.

The method may also comprise an assisted landing phase P2 during which the processing device guides the aircraft from the hang point C up to the end point D on the runway.

The assisted navigation phase P1 may comprise a first guiding step E1 of the aircraft from the return point A in the direction of the position of the deviation indicator E, from measurements of azimuth deviation relative to a reference direction transmitted by the deviation indicator. For this purpose, the direction AE connecting the return point A with the position of the deviation indicator E can be taken as the reference direction, and the measurement of the true azimuth of the aircraft measured at each instant by the deviation indictor can be used by the latter to determine at each instant the deviation between measured azimuth and the reference direction. The deviation indicator can then, at each instant, transmit the calculated azimuth deviation to the data processing device via one of the data links. The processing device, at each instant, can then guide the aircraft so as to cancel this deviation, thereby causing the aircraft to follow the reference direction by directing it towards the position of the deviation indicator E. This first guiding step E1 may comprising determining of the position of the aircraft at the predetermined capture point B approximately aligned with the return point A and the position of the deviation indicator E. The processing device can therefore determine the moment at which the aircraft, whose true position is unknown since its departure from return point A, reaches the capture point B of known position.

As explained above, the positioning of the aircraft at the capture point B can be determined from distance data between the aircraft 1 and a reference point on the ground aligned with the return point A and the position of the deviation indicator E, e.g., the point E itself. The positions of the deviation indicator E and of the capture point B being known, and the aircraft being aligned with these two points, the processing device from distance data between the aircraft and the deviation indicator is able to infer the distance between the aircraft and the capture point B. When this distance is zero, the aircraft is positioned at the capture point B to within measurement uncertainties.

These distance data can be received via one of the two-way radio links from the ground station. These distance data can also be determined by the processing device itself from measurements of one-way or round-trip propagation time between the aircraft and the ground station.

Alternatively, these distance data can be determined by determining a position of the aircraft from a controlled variation in aircraft azimuth, or aircraft elevation when it is sufficiently close to the ground station. Such controlled variation can be induced by a remote pilot located in the ground station. For this purpose, the aircraft may perform a predetermined variation in altitude for example, controlled by altimeter measurements. Such variation leads to elevation variation in the measurement data obtained by the deviation indicator. This variation allows determining of the position of the aircraft and hence the distance separating the aircraft from the position of deviation indicator E.

Determination of the position of the aircraft at the capture point B may comprise estimation of speed data of said aircraft and determination of the distance travelled by the aircraft from the return point A, from said speed data for example by integration thereof throughout travel of the aircraft. The positions of the return point A and capture point B being known, and the aircraft being aligned with these two points, the processing device from the distance data between the aircraft and the return point A is able to infer the distance between the aircraft and the capture point B. If this distance is zero, the aircraft is positioned at the capture point B, to within measurement uncertainties.

The aircraft speed data can be estimated by the optronic system 6 by measuring the ground speed using images captured by the image capture device and altitude data provided by the altimeter.

The aircraft speed data can also be estimated by measuring a Doppler effect generated by movement of the aircraft. For example, the data processing device can measure a frequency shift induced by movement of the aircraft in the signals received on one of the two data links sent from the ground station and the deviation indicator.

The aircraft speed data can also be measured by an onboard system such as Pitot tubes. Since such tubes only measure the speed of the aircraft relative to ambient air, and therefore possibly not truly reflecting the speed of the aircraft relative to the ground in the event of wind, these data can be completed by data on the speeds of ambient winds along the trajectory followed by the aircraft. These speed data can be determined by a weather station integrated in the ground station using known methods.

Determination of the positioning of the aircraft at the capture point B can also be determined by detecting a landmark of known position in at least one image captured by said image capture device, as explained above, completed with aircraft altitude data provided by the altimeter. The image capture device may also be used to detect a landmark of known position well before the aircraft arrives in the vicinity of capture point B, on the pathway from the return point. Such detection can be used to verify and if necessary correct the distance between the current position of the aircraft and the capture point B, as determined by one of the above-described methods.

Such a landmark used to determine the positioning of the aircraft at the capture point B may be the position E of the deviation indicator itself. At the first guiding step E1, the aircraft is directed towards the position of the deviation indicator E that therefore lies in the propagation axis of the aircraft and in the field of vision of the optronic system. The optronic system, in the images of the image capture device, is capable of detecting the deviation indicator at a distance of about 1 to 2 km. The deviation indicator generally being positioned in the vicinity of the runway, the aircraft is therefore at a comparable distance therefrom that is adapted for performance of a predefined movement up to the hang point C so as to align the aircraft with the axis of the runway. The hang point C may also be merged with the position of the deviation indicator E if the latter is approximately aligned with the runway axis.

In the different embodiments for determining the positioning of the aircraft at the capture point B having recourse to the optronic system, the latter may use images from the camera e.g. in the event of failure of the image capture device 14.

For such a determining of the positioning of the aircraft at the capture point B as a function of the position of the deviation indicator E, knowledge of the absolute geographical coordinates of capture point B, of hang point C and of the position of the deviation indicator E is not necessary. Knowledge of the relative positions of these points relative to each other and relative to the runway is sufficient for efficient guiding of the aircraft relative to the runway and for correct positioning thereof for landing. This may be of particular interest if the runway is provisional and if conditions, such as absence of a GPS signal for example, make precise positioning of the runway difficult. In addition, no other reference point is required to allow proper functioning of the optronic system and guiding of the aircraft.

Finally, determination of the positioning of the aircraft at the capture point B can be obtained by determining the position data of the aircraft as longitude and latitude. Satellite positioning data being unavailable, the position of the aircraft can be determined from:
  the azimuth determined by the deviation indicator; and
  two data from among:
    the elevation of the aircraft measurable by the deviation indicator;
    the distance between the aircraft and deviation indicator, determined as indicated above;
    the altitude of the aircraft relative to the deviation indicator, obtained from altimeter measurements.

The computing of position data from measurements transmitted by the deviation indicator can be performed in polar coordinates centered on the position of the deviation indicator E, and the position data of the aircraft obtained can be converted to cartesian coordinates in the form of longitude and latitude.

After the first guiding step E1, the aircraft is therefore positioned at the capture point B. The assisted return navigation phase P1 may then comprise a second guiding step E2 of the aircraft along a predefined trajectory from the capture point B to the hang point C approximately aligned with the axis of the runway. Along this predefined trajectory, the aircraft may be deviated by wind from the theoretical trajectory to be followed. To correct the position of the aircraft for maintaining thereof on the predefined trajectory, guiding of the aircraft can be performed from altitude data provided by the altimeter and from course and speed data of the aircraft. Guiding can also be improved by taking local weather data into consideration, such as wind data or by readjusting the aircraft occasionally or continually relative to a particular landmark e.g. the end point D or the position of the deviation indicator E. In particular, guiding of the aircraft can be performed by keeping this landmark visible in the images captured by the optronic system at a defined angle position as a function of progression along the trajectory between the capture point B and the hang point C.

Throughout this first guiding step E1, the predefined trajectory followed by the aircraft between return point A and the capture point B may be rectilinear in direction of the position of the deviation indicator, thereby minimizing the distance travelled and energy consumption to reach the capture point B.

Alternatively, the predefined trajectory followed the aircraft between the return point A and capture point B may be zigzagged or in stair steps. Such a trajectory allows slight variation in the orientation of the position of the directional antenna of the ground station, and thereby reduced uncertainty regarding azimuth and/or elevation measured by the deviation indicator.

The above-described steps allow the position of the aircraft to be obtained with sufficient accuracy to bring the aircraft into line with the runway up to the hang point C. Nonetheless, the accuracy obtained may prove to be insufficient to guide the aircraft as far as the end point and to cause it to land on the runway. With insufficient positioning certainty there is a risk that the aircraft will be guided alongside the runway. It may therefore be desirable to obtain the position of the aircraft with increased accuracy to guarantee safe landing.

Figure 5:
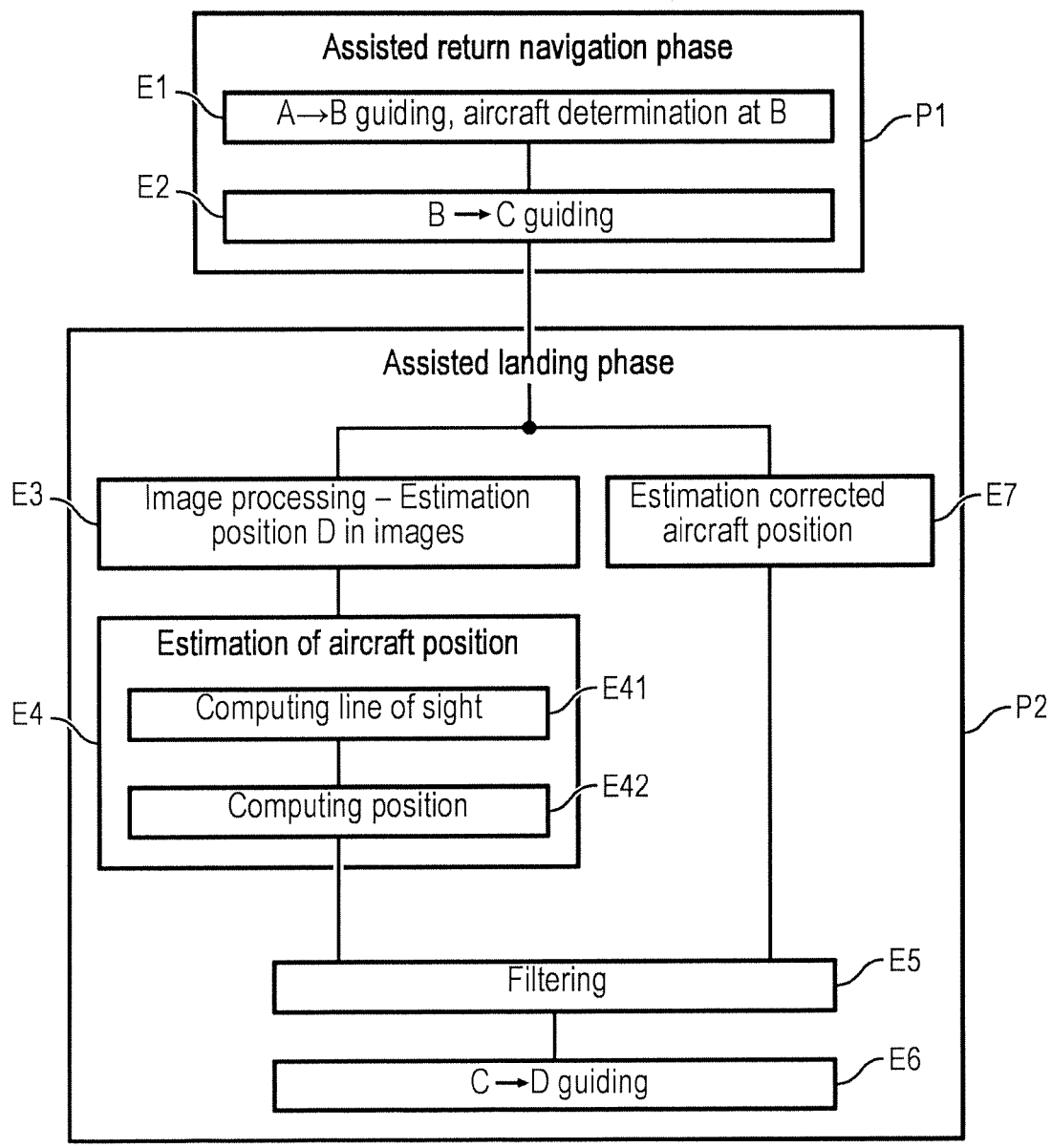
FIG. 5 is a diagram schematizing an example of embodiment of a method for automatic assisted landing of an aircraft according to the invention.
Figure 6:
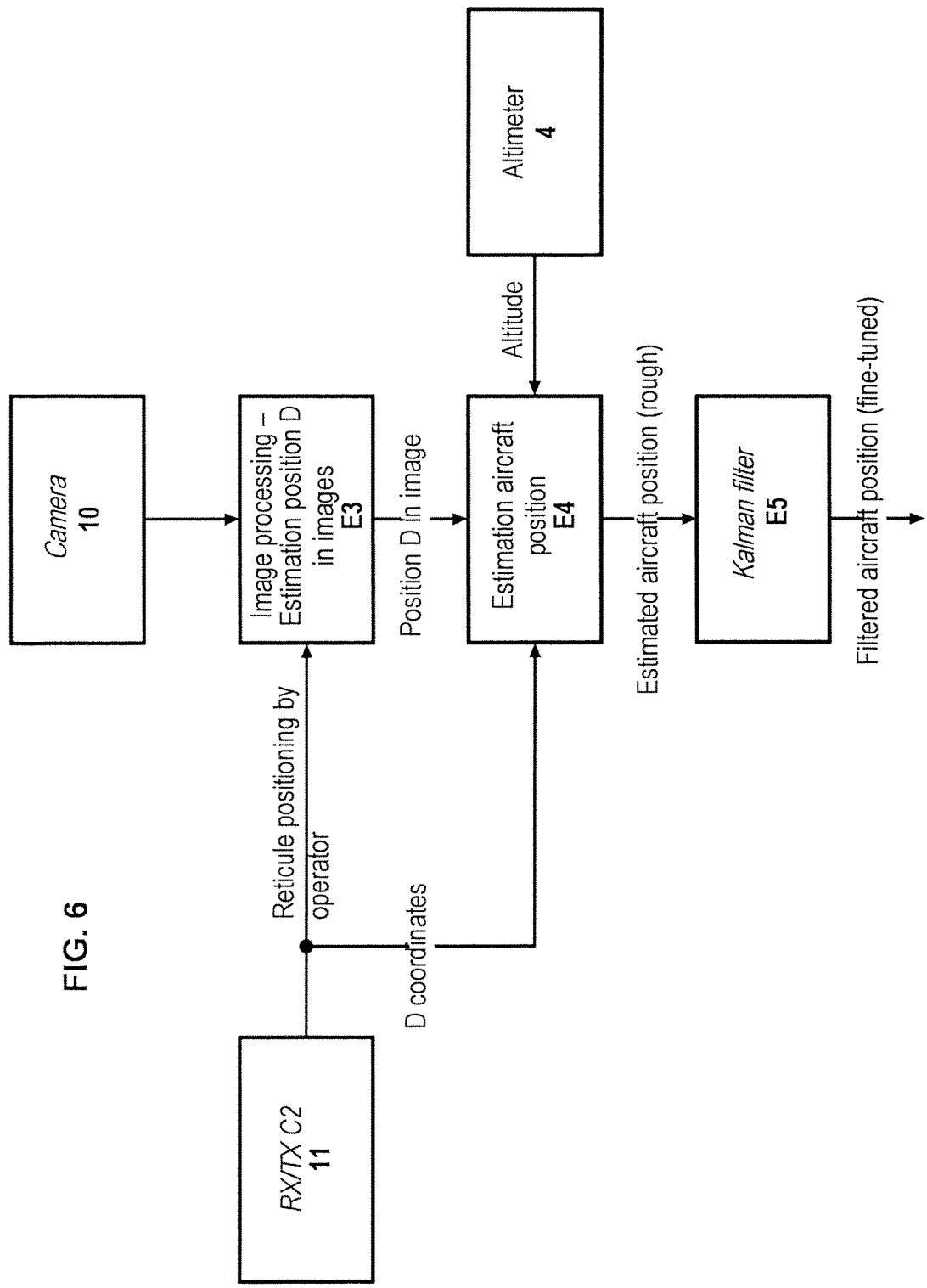
FIG. 6 illustrates the assisted landing phase of the invention when the assistance system is equipped with a camera.

In a first embodiment, illustrated in FIG. 5 and FIG. 6, the assisted landing phase P2, during which the aircraft is guided from the catch point C to the end point D, can use the images of the runway and of the end point D provided by the camera 10 onboard the aircraft. For this purpose, the assisted landing phase P2 may comprise an image processing step E3 at which the position of the end point D is estimated in one or more images from among a flow of images of the runway successively captured by the camera. This step can be implemented repeatedly throughout the approach of the aircraft to the runway nod landing.

This detection of the end point in an image can be fully automatic if the end point is easily detectable in the image, for example if the end point is materialized on the runway by a ground mark, or if the runway itself can be identified by the presence on the ground of one or more identifications such as markings or lights visible in the spectral band of the optronic system. The position of the end point in the image can then be determined using known shape or image recognition techniques.

Figure 7:
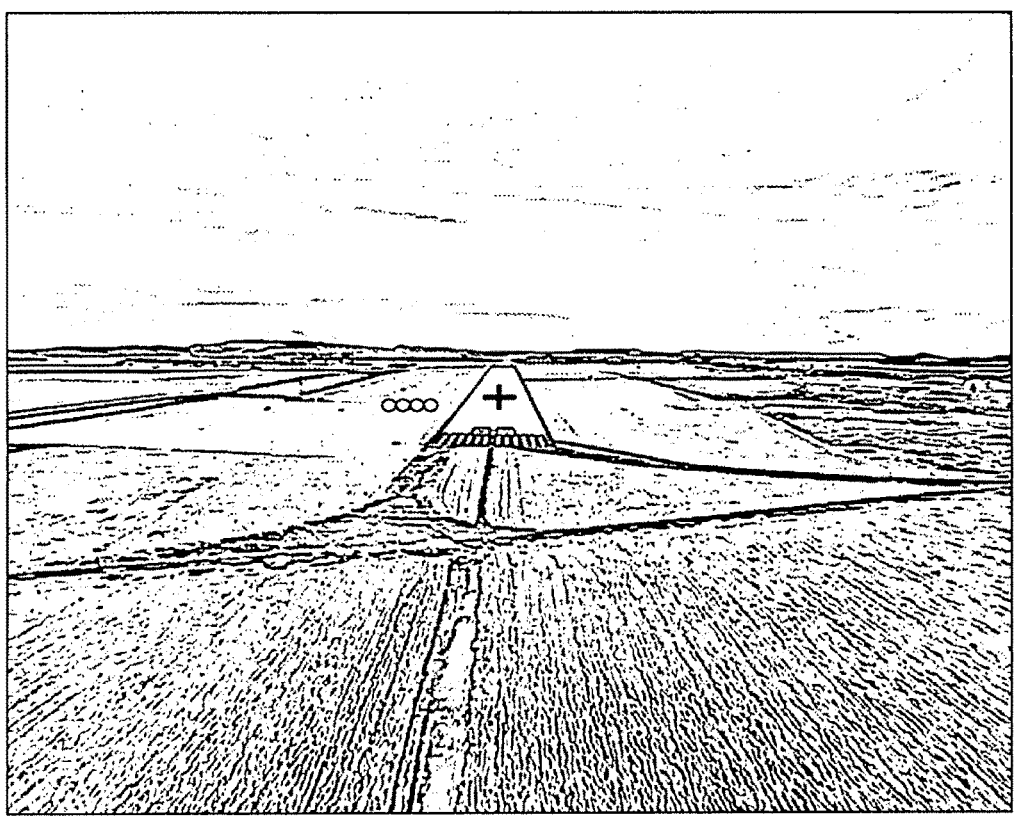
FIG. 7 illustrates the positioning of a reticule in an image on the end point.

Alternatively, the position of the end point in an image can be specified by a human operator in a first image, via the command/control link 11, for example by positioning a sighting reticule in the image on the end point, as illustrated in FIG. 7. The processing device can then ensure tracking of the position of the end point indicated by the reticule in the images subsequently provided by the onboard camera, and automatically adjust the position of the reticule to keep it centered on the end point. Such manual initiation of tracking may be necessary when marking of the runway or of the end point is insufficient for automatic detection, or when flight conditions (night flight, rain, fog . . . ) do not allow such automatic detection. If necessary, the operator can correct positioning of tracking by manually adjusting the position of the reticule in the current image one or more times so that the reticule remains properly positioned on the end point in the successive processed images. To facilitate automatic tracking of the position of the end point, visible or infrared light sources adapted to the detection spectrum of the image capture system can be arranged either side of the runway at the end point.

The assisted landing phase P2 may also comprise a first position-determining step E4 at which the position of the aircraft is estimated as a function of the estimated position of the end point in the image, at the image processing step E3. This estimation also requires altitude data of the aircraft provided by the altimeter and the coordinates of the end point which can be provided by the ground station via the command/control link 11. After the first position-determining step E4, the processing device is provided with a position of the aircraft e.g. in the form of longitude and latitude. This position can then be used to perform guiding of the aircraft until landing thereof at the end point D at a third guiding step E6 at which the guiding of the aircraft from the hang point C to the end point D is obtained by keeping the aircraft aligned with the axis of the runway. The position data of the aircraft obtained after the first position-determining step E4 can be filtered with a Kalman filter at a filtering step E5 to fine-tune estimation of the position of the aircraft before using this position to guide the aircraft at the third guiding step E6.

A nonlimiting example of embodiment of the first position-determining step E4 is given in the following paragraphs. Alternatively, other embodiments well known to persons skilled in the art could be implemented. As illustrated in FIG. 5, the first position-determining step E4 may comprise a line of sight computing step E41 at which the line of sight of the aircraft at the end point D is determined in the earth-centered reference frame.

This determination can be obtained from:
- $(D_L, D_G, D_Z)$ the position of the end point D provided by the ground station;
- $(D_H, D_V)$ the X- and Y-axes of the end point indicated by the reticule in the image of the onboard camera, obtained after the image processing step E3, for example relative to the upper left corner of the image;
- $(C\varphi, C\theta, C\psi)$ the positioning angles of the onboard camera in a reference frame attached to the aircraft;
- $(C_{AOH}, C_{AOV})$ the horizontal and vertical aperture angles of the camera;
- $(C_{RH}, C_{RV})$ the horizontal and vertical resolutions of the camera;
- $(A\varphi, A\theta, A\psi)$ the roll, pitch and course angles of the aircraft provided by the inertial unit;
- $A_Z$ the altitude of the aircraft provided by the altimeter.

The following are also denoted:
- $C_{azimut}$ and $C_{elevation}$: the azimuth and elevation of the aircraft in the camera reference frame;
- RT: the earth's radius
- Vx: vector associated with the line of sight in the camera reference frame
- Vy: vector associated with the $1^{st}$ normal to the line of sight in the camera reference frame
- Vz: vector associated with the $2^{nd}$ normal to the light of sight in the camera reference frame
- Wx: vector associated with the line of sight in the earth-centered reference frame
- Wy: vector associated with $1^{st}$ normal to the line of sight in the earth-centered reference frame
- Wz: vector associated with the $2^{nd}$ normal to the line of sight in the earth-centered reference frame The line of sight computing step E41 may then comprise the following operations:

determining the elementary angle associated with a pixel:

$$A_H = \frac{C_{AOH}}{C_{RH}}$$

$$A_V = \frac{C_{AOV}}{C_{RV}}$$

determining the angle position of the line of sight relative to the axis of the camera:

$$C_{azimuth} = D_H \cdot A_H - \frac{C_{AOH}}{2}$$

$$C_{elevation} = D_V \cdot A_V - \frac{C_{AOV}}{2}$$

determining the line of sight in the camera reference frame:

Vector associated with the line of sight towards the end point:

$$V_x = \begin{pmatrix} \cos(C_{azimuth})\cos(C_{elevation}) \\ \sin(C_{azimuth})\cos(C_{elevation}) \\ \sin(C_{elevation}) \end{pmatrix}$$

Vector associated with the first normal to the line of sight towards the end point:

$$V_y = \begin{pmatrix} -\sin(C_{azimuth}) \\ \cos(C_{azimuth}) \\ 0 \end{pmatrix}$$

Vector associated with the second normal to the line of sight towards the end point:

$$V_z = V_x \wedge V_y$$

forming a matrix for transition from the camera reference frame to the aircraft reference frame:

$$MP_{C \to A} = \begin{pmatrix} \cos(C_\theta)\cos(C_\psi) & \sin(C_\theta)\sin(C_\varphi)\cos(C_\psi) - \sin(C_\psi)\cos(C_\varphi) & \cos(C_\psi)\sin(C_\theta)\cos(C_\varphi) + \sin(C_\varphi)\sin(C_\psi) \\ \cos(C_\theta)\sin(C_\psi) & \sin(C_\theta)\sin(C_\varphi)\sin(C_\psi) + \cos(C_\psi)\cos(C_\varphi) & \sin(C_\theta)\cos(C_\varphi)\sin(C_\psi) - \sin(C_\varphi)\cos(C_\psi) \\ -\sin(C_\theta) & \cos(C_\theta)\sin(C_\varphi) & \cos(C_\theta)\cos(C_\varphi) \end{pmatrix}$$

forming a matrix for transition of the end point from the aircraft reference frame to the local terrestrial reference frame:

$$MP_{A \to RTL} = \begin{pmatrix} \cos(A_\theta)\cos(A_\psi) & \sin(A_\theta)\sin(A_\varphi)\cos(A_\psi) - \sin(A_\psi)\cos(A_\varphi) & \cos(A_\psi)\sin(A_\theta)\cos(A_\varphi) + \sin(A_\varphi)\sin(A_\psi) \\ \cos(A_\theta)\sin(A_\psi) & \sin(A_\theta)\sin(A_\varphi)\sin(A_\psi) + \cos(A_\psi)\cos(A_\varphi) & \sin(A_\theta)\cos(A_\varphi)\sin(A_\psi) - \sin(A_\varphi)\cos(A_\psi) \\ -\sin(A_\theta) & \cos(A_\theta)\sin(A_\varphi) & \cos(A_\theta)\cos(A_\varphi) \end{pmatrix}$$

forming a matrix for transition of the end point from the local terrestrial reference frame to the earth-centered reference frame:

$$MP_{RTL \to RTC} = (x_t \quad y_t \quad -u_t)$$

$$u_t = \begin{pmatrix} \cos(D_L)\cos(D_G) \\ \cos(D_L)\sin(D_G) \\ \sin(D_L) \end{pmatrix}$$

$$y_t = \frac{\begin{pmatrix} 0 \\ 0 \\ 1 \end{pmatrix} \wedge u_t}{\left\| \begin{pmatrix} 0 \\ 0 \\ 1 \end{pmatrix} \wedge u_t \right\|} = \frac{1}{|\cos(D_L)|} \begin{pmatrix} -\cos(D_L)\sin(D_G) \\ \cos(D_L)\cos(D_G) \\ 0 \end{pmatrix}$$

$$x_t = u_t \wedge y_t = \frac{1}{|\cos(D_L)|} \begin{pmatrix} -\sin(D_L)\cos(D_L)\cos(D_G) \\ -\sin(D_L)\cos(D_L)\sin(D_G) \\ (\cos(D_L))^2 \end{pmatrix}$$

computing the matrix for transition from the camera reference frame to the earth-cantered reference frame:

$$MP_{C \to RTC} = MP_{RTL \to RTC} \cdot MP_{A \to RTL} \cdot MP_{C \to A}$$

determining the line of sight ($W_x$, $W_y$, $W_z$) in the earth-centered reference frame Vector associated with the line of sight in the earth-centered reference frame:

$$W_x = MP_{C \to RTC} \cdot V_x$$

Vector associated with $1^{st}$ normal to the line of sight towards the end point:

$$W_y = MP_{C \to RTC} \cdot V_y$$

Vector associated with the $2^{nd}$ normal to the line of sight towards the end point:

$$W_z = MP_{C \to RTC} \cdot V_z$$

The first position-determining step E4 may then comprise a position-computing step E42 at which:
the equations are determined of:
the plane having a normal $u_t$ tangent to the point resulting from projection of the end point to the altitude of the aircraft;
the plane generated by ($W_x, W_z$) with normal $W_y$ and passing through ($D_L, D_G, D_Z$).
the plane generated by ($W_x, W_y$) with normal $W_z$ and passing through ($D_L, D_G, D_Z$).
the coordinates of the aircraft are determined in the earth-centered reference frame.
They correspond to the point of intersection of these three planes:
Solution X is obtained by solving the linear system MX=A when $u_t^T W_x < 0$,
where:

$$M = \begin{pmatrix} u_t^T \\ W_y^T \\ W_z^T \end{pmatrix}$$

$$A = (R_T + A_Z) \begin{pmatrix} u_t^T u_t \\ u_t^T W_y \\ u_t^T W_z \end{pmatrix}$$

The solution of the above linear system is:

$$X = \begin{pmatrix} x_1 \\ x_2 \\ x_3 \end{pmatrix} = M^{-1} A$$

The latitude and longitude are then given by:

$$L = \sin^{-1}\left(\frac{x_3}{\|X\|}\right)$$

$$G = \arg(x_1 + ix_2)$$

Figure 8:
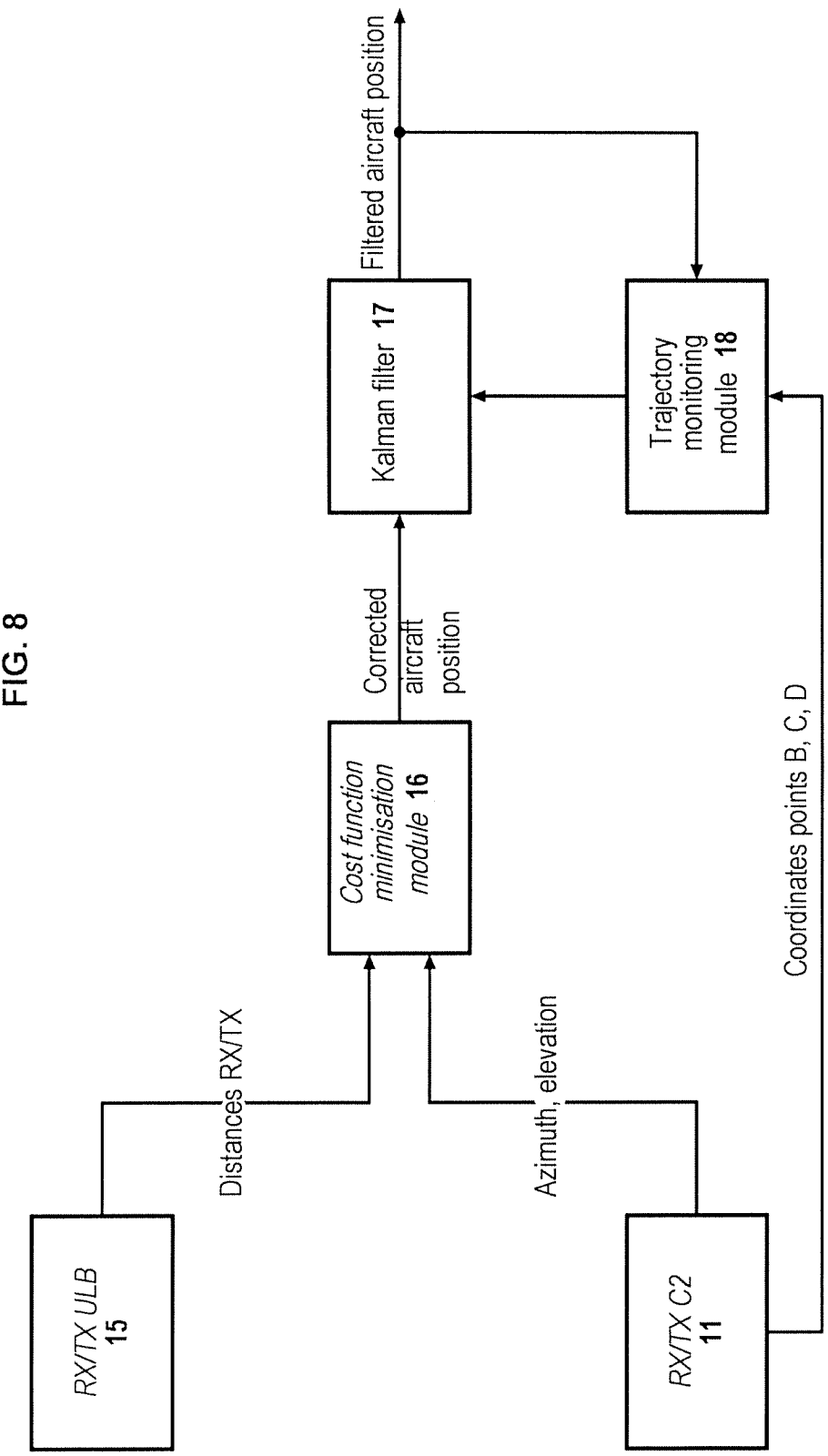
FIG. 8 is a diagram illustrating the computing of corrected position data from measurements transmitted by the deviation indicator according to one embodiment of the invention.

In a second embodiment, illustrated in FIG. 5 and FIG. 8, the assisted landing phase P2, at which the aircraft is guided to the hang point C and end point D, can use the distance data between a transceiver onboard the aircraft and at least three transceivers positioned on the ground. For this purpose, the assisted landing phase P2 may comprise a second position-determining step E7 at which the position data of the aircraft are estimated from distance data between the onboard transceiver and said at least three transceivers positioned on the ground. As explained above, the distance between each transceiver on the ground and the onboard transceiver can be determined by exchange of signals between these transmitters. Since the position of the ground transceivers is known, these distance data can be used to minimize uncertainty on the position of the aircraft. Optionally, determination of the position data of the aircraft may also make use of the azimuth and elevation measurements transmitted by the deviation indicator when such measurements are available.

For this purpose, the computing of position data using measurements transmitted by the deviation indicator and the distances between transceivers (ER) can be performed with a minimization module 16 minimizing a cost function. Such cost function may be a mathematical expression comprising power difference terms between a distance measured between the onboard transceiver and a ground transceiver and a corresponding distance computed from the position of the aircraft and the position of the ground transceiver, and optionally differences between the true position coordinates of the aircraft and the corresponding coordinates provided by the deviation indicator. These powers can be chosen arbitrarily or selected so as to modulate or enhance the relative importance of the contributions relative to one another. The desired position coordinates are therefore those chosen to be the true position coordinates minimizing the cost function according to a "least power" criterion. One simple example of a cost function C not taking into account the elevation measurement provided by the deviation indicator is given below. For example, this cost function comprises a term C1 that is a function of the distance data between the onboard transceiver and the transceivers on the ground, and a term C2 that is a function of the azimuth measurement provided by the deviation indicator.

$$C(x(t), y(t)) = \underbrace{C_1(x(t), y(t))}_{ER\ ULB} + \underbrace{C_2(x(t), y(t))}_{deviation\ indicator}$$

Determination of the position of the aircraft being obtained discretely, it is assumed in this example that it is performed periodically with a sampling period T. The instant t=kT is taken:

$$C_1(x(kT), y(kT)) = \sum_{m=0}^{k} \sum_{n=1}^{N} w_n(mT) \left( \frac{\sqrt{(x(mT) - x_n)^2 + (y(mT) - y_n)^2} - \sqrt{d_n^2(mT) - A_Z^2(mT)}}{\delta_{maxi}^{ULB}(mT)} \right)^o$$

$$C_2(x(kT), y(kT)) = \sum_{m=0}^{k} \left( \frac{(\theta(mT) - \theta_e(mT))^2}{\sigma_e^2} \right)^q$$

where:
(x(mT), y(mT)): Retained position of the aircraft at instant mT.
θ(mT): Retained azimuth of the aircraft relative to the reference direction at instant mT.
$\theta_e$(mT): Measured azimuth of the aircraft relative to the reference direction at instant mT.
$\sigma_e$: Standard deviation of measurement error by the deviation indicator.
($x_n$, $y_n$): Position of ER ULB on the ground, of subscript n.
N: Number of ER ULBs deployed on the ground (N≥3).

$d_n$(τ): Measurement of distance between the aircraft and the ground ER ULB of subscript n at instant τ.
$\delta_{maxi}^{ULB}$(τ): Maximum error of distance made when measuring distance.
$w_n$(τ): 1 if distance measurement is possible (ground ER is within the range of onboard ER), otherwise 0.
o, p, q: Optional parameters allowing gradual conforming of the cost function to a "rectangular well" (when o, p, q→∞).

The angle θ(t) is related to the coordinates (x(t),y(t)) as follows:

$$\theta(t) = Re(-i\ \log(x(t) + iy(t)))$$

where Re designates the true part.

The terms C1 and C2 given as an example are respectively functions of distance data and of azimuth measurements provided at several instants mT before instant kT at which the corrected position data x(t), y(t) are to be found. The distance measurements $d_n$(mT), position coordinates (x(mT), y(mT)), and azimuth measurements θ(mT), $\theta_e$(mT) having been already determined or measured for the instants preceding t=kT, these terms are assumed to be known for m<k.

Minimizing C(x(t),y(t)) therefore amounts to minimising:

$$\Gamma(k) = \sum_{n=1}^{N} w_n(k) \left( \frac{\sqrt{(x(k) - x_n)^2 + (y(k) - y_n)^2} - \sqrt{d_n^2(k) - A_Z^2(k)}}{\delta_{maxi}^{ULB}(mT)} \right)^o +$$

$$\left( \frac{\sqrt{x(k) - x_I(k))^2 + (y(k) - y_I(k))^2}}{\delta_{maxi}^{CI}(k)} \right)^p +$$

$$\left( \frac{(Re(-i\log(x(k) + iy(k))) - \theta_e(k))^2}{\sigma_e^2} \right)^q$$

The solution is obtained as presented above by solving the following equation system, e.g. with the Newton-Raphson method:

$$\begin{cases} \frac{\partial \Gamma}{\partial x} = f_x = 0 \\ \frac{\partial \Gamma}{\partial y} = f_y = 0 \end{cases}$$

Alternatively, the altitude of the ground transceivers zn can be taken into account and minimization of the cost function can be used to determine the altitude of the aircraft z(t). This cost function can then be written:

$$C(x(t), y(t), z(t)) = \underbrace{C_1(x(t), y(t), z(t))}_{ER\ ULB} + \underbrace{C_2(x(t), y(t))}_{deviation\ indicator}$$

Where:

$$C_1(x(kT), y(kT)) = \sum_{m=0}^{k} \sum_{n=1}^{N} w_n(mT) \left( \frac{\sqrt{(x(mT) - x_n)^2 + (y(mT) - y_n)^2 + (z(mT) - z_n)^2} - d_n(mT)}{\delta_{maxi}^{ULB}(mT)} \right)^o$$

Minimizing C(x(t) y(t), z(t)) therefore amounts to minimizing:

$$\Gamma(k) = \sum_{n=1}^{N} w_n(k) \left( \frac{\sqrt{(x(k)-x_n)^2 + (y(k)-y_n)^2 + (z(k)-z_n)^2} - d_n(k)}{\delta_{maxi}^{ULB}(k)} \right)^o +$$

$$\left( \frac{\sqrt{(x(k)-x_I(k))^2 + (y(k)-y_I(k))^2}}{\delta_{maxi}^{CI}(k)} \right)^p +$$

$$\left( \frac{(\text{Re}(-i\log(x(k)+iy(k))) - \theta_e(k))^2}{\sigma_e^2} \right)^q$$

The solution is obtained as presented above, by solving the following equation system e.g. with the Newton-Raphson method:

$$\begin{cases} \frac{\partial \Gamma}{\partial x} = f_x = 0 \\ \frac{\partial \Gamma}{\partial y} = f_y = 0 \\ \frac{\partial \Gamma}{\partial z} = f_z = 0 \end{cases}$$

The corrected position data (x(t), y(t)) obtained by minimization of the cost function can be filtered using a Kalman filter 17 to fine-tune estimation of the position of the aircraft before using this position for guidance of the aircraft, and the state matrix of the filter can be adapted to take into account the profile of the predefined trajectory to be followed by the aircraft 18.

With the proposed method it is therefore possible to obtain guiding of the aircraft as far as the end point and to cause it to land, despite the unavailability of satellite positioning.

The invention claimed is:

1. A method for the assisted landing of an aircraft on a runway from a return point to an end point at which the aircraft comes into contact with the runway,
said method being implemented by a data processing device onboard said aircraft connected to:
an altimeter configured to measure the altitude of the aircraft;
a deviation indicator positioned at a ground station and configured to measure an azimuth deviation of the aircraft relative to a reference direction connecting said return point and the position of the deviation indicator;
said method comprising:
an assisted return navigation phase including:
guiding the aircraft, based on measurements of azimuth deviation of the aircraft relative to said reference direction transmitted by the deviation indicator, from the return point in the direction of the position of the deviation indicator;
determining the position of the aircraft at a predetermined capture point aligned with the return point and the position of the deviation indicator;
after said determining, guiding the aircraft along a predefined trajectory from the capture point to a predetermined hang point aligned with the axis of the runway from altitude data provided by the altimeter and course and speed data of the aircraft;
an assisted landing phase including after said navigation phase, guiding the aircraft from the hang point to the end point on the runway.

2. The assistance method according to claim 1, wherein the positioning of the aircraft at the capture point is determined from distance data between the aircraft and a reference point on the ground aligned with the return point and the position of the deviation indicator.

3. The assistance method according to claim 2, wherein said distance data are estimated from measurements of the propagation time of data packets between the ground station and the aircraft.

4. The assistance method according to claim 3, wherein said distance data are estimated from measurements of the one-way propagation time of data packets between the ground station and the aircraft, said ground station and the aircraft comprising synchronized clocks.

5. The assistance method according to claim 1, wherein determination of the positioning of the aircraft at the capture point comprises estimation of speed data of said aircraft, and determination of a distance travelled by the aircraft from the return point from said speed data.

6. The assistance method according to claim 5, wherein the data processing device being configured to be further linked to an optronic system comprising an image capture device onboard the aircraft and positioned along the axis of the aircraft, and an image processing device adapted for processing said images, the speed data of said aircraft is estimated by said optronic system by measuring the ground speed using images captured by said image capture device and altitude data provided by the altimeter.

7. The assistance method according to claim 5, wherein the speed data of said aircraft is estimated by measuring a Doppler effect generated by movement of the aircraft on signals exchanged between the aircraft and the ground station.

8. The assistance method according to claim 1, wherein the data processing device being configured to be further linked to an image capture device onboard the aircraft), the positioning of the aircraft at the capture point is determined by detecting a landmark of known position in at least one image captured by said image capture device.

9. The assistance method according to claim 1, wherein the aircraft is guided between the return point and the capture point along a predefined rectilinear trajectory in the direction of the position of the deviation indicator.

10. The assistance method according to claim 1, wherein the aircraft is guided between the return point and the capture point along a zigzag or stair-step trajectory.

11. The assistance method according to claim 1, wherein the data processing device being configured to be further linked to a camera onboard the aircraft, the assisted landing phase comprises estimation of a position of the end point in an image of the runway captured by the camera, and estimation of a position of the aircraft as a function of said estimated position of the end point in the image and of altitude data provided by the altimeter, and wherein said guiding of the aircraft from the hang point to the end point is achieved by maintaining the aircraft aligned with the axis of the runway.

12. The assistance method according to claim 1, wherein the data processing device being further configured to be linked to a transceiver onboard said aircraft and intended to receive signals transmitted by at least three transceivers positioned on the ground, the assisted landing phase comprises estimation of position data of the aircraft from distance data between the onboard transceiver and said at least three transceivers positioned on the ground.

13. The assistance method according to claim 1, wherein the aircraft is further guided from measurements of elevation deviation of the aircraft relative to a reference plane.

14. A computer program product comprising code instructions to execute a method according to claim 1 when this program is executed by a processor.

15. A data processing device configured to implement a method for the assisted landing of an aircraft on a runway from a return point to an end point at which the aircraft comes into contact with the runway,
said method being implemented by a data processing device onboard said aircraft and configured to be connected to:
an altimeter configured to measure the altitude of the aircraft;
a deviation indicator positioned at a ground station and configured to measure an azimuth deviation of the aircraft relative to a reference direction connecting said return point and the position of the deviation indicator;
wherein said method comprises:
an assisted return navigation phase comprising:
guidance of the aircraft, based on measurements of azimuth deviation of the aircraft relative to said reference direction transmitted by the deviation indicator, from the return point in the direction of the position of the deviation indicator;
determination of the position of the aircraft at a predetermined capture point aligned with the return point and the position of the deviation indicator;
guidance of the aircraft along a predefined trajectory from the capture point to a predetermined hang point aligned with the axis of the runway from altitude data provided by the altimeter and course and speed data of the aircraft;
an assisted landing phase comprising guidance from the hang point to the end point on the runway.

16. A system for automatic assisted landing of an aircraft on a runway from a return point to an end point at which the aircraft comes into contact with the runway, comprising:
an altimeter configured to measure the altitude of the aircraft;
a deviation indicator positioned at a ground station and configured to measure an azimuth deviation of the aircraft relative to a reference point relative to a reference direction connecting said return point and the position of the deviation indicator,
the data processing device according to claim 15.

17. The assistance system according to claim 16, wherein the deviation indicator is connected to a directional antenna.

18. The assistance system according to claim 16, further comprising an optronic system comprising an image capture device onboard the aircraft, configured to be connected to the data processing device.

19. The assistance system according to claim 16 further comprising a camera and its associated image processing device, configured to be connected to the data processing device.

20. The assistance system according to claim 16 further comprising:
at least three transceivers positioned on the ground;
a transceiver configured to receive signals transmitted by said at least three transceivers positioned on the ground, onboard said aircraft and configured to be connected to the data processing device.

* * * * *